United States Patent
Ozeki et al.

(10) Patent No.: US 7,324,225 B2
(45) Date of Patent: Jan. 29, 2008

(54) MULTIFUNCTION SYSTEM

(75) Inventors: Shinobu Ozeki, Nakai-machi (JP); Tsutomu Hamada, Nakai-machi (JP); Junji Okada, Nakai-machi (JP); Masao Funada, Nakai-machi (JP); Takeshi Kamimura, Nakai-machi (JP); Hidenori Yamada, Nakai-machi (JP); Kazuhiro Sakai, Nakai-machi (JP); Shinya Kyozuka, Nakai-machi (JP); Hiroki Ishida, Isehara (JP); Osamu Takanashi, Nakai-machi (JP); Masaaki Miura, Nakai-machi (JP); Kenichi Kobayashi, Nakai-machi (JP); Tsuyoshi Yaguchi, Ebina (JP); Kazuhiro Hama, Ebina (JP); Toshiki Matsui, Ebina (JP); Yasuhiro Arai, Ebina (JP); Hirotaka Mori, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1027 days.

(21) Appl. No.: 09/865,570

(22) Filed: May 29, 2001

(65) Prior Publication Data

US 2002/0093677 A1  Jul. 18, 2002

(30) Foreign Application Priority Data

May 29, 2000 (JP) ............................. 2000-159233

(51) Int. Cl.
*B41J 1/00* (2006.01)
*G06K 1/00* (2006.01)
*B41B 1/00* (2006.01)
*G06F 15/00* (2006.01)
*B41F 1/00* (2006.01)

(52) U.S. Cl. ...................................... 358/1.15; 358/1.1
(58) Field of Classification Search ................ 358/1.15; 399/1, 91, 107, 411; 379/56.2; 380/256; 385/115, 129, 100, 2
See application file for complete search history.

(56) References Cited

U.S. PATENT DOCUMENTS

| 4,213,670 | A |   | 7/1980 | Milton et al. |
| 5,077,817 | A | * | 12/1991 | Shang ........................... 385/46 |
| 5,822,475 | A | * | 10/1998 | Hirota et al. .................. 385/24 |
| 5,872,869 | A | * | 2/1999 | Shimizu et al. ............. 382/282 |
| 6,295,148 | B1 | * | 9/2001 | Atlas ............................. 398/9 |

FOREIGN PATENT DOCUMENTS

| JP | A 7-25079 | 1/1995 |
| JP | A 10-62657 | 3/1998 |

* cited by examiner

Primary Examiner—Thomas D. Lee
(74) Attorney, Agent, or Firm—Oliff & Berridge, PLC

(57) ABSTRACT

A multifunction system has advanced functions and high speed capability and is excellent in expandability. The multifunction system includes a controller, an IIT, an IOT, and a light distributing device. For a print job, print data outputted from the controller is converted into optical signals, which enter a light distributing device and are transmitted to the IOT of the emission side. The IOT prints the received data onto a printer. For a copy job, copy data outputted from IIT is converted into optical signals, which enter the light distributing device, and are transmitted to the IOT of the emission side. For a scan job, scan data outputted from the scanner is converted into optical signals, which enter the light distributing device, and are transmitted to the controller of the emission side. The controller processes the received data.

17 Claims, 11 Drawing Sheets

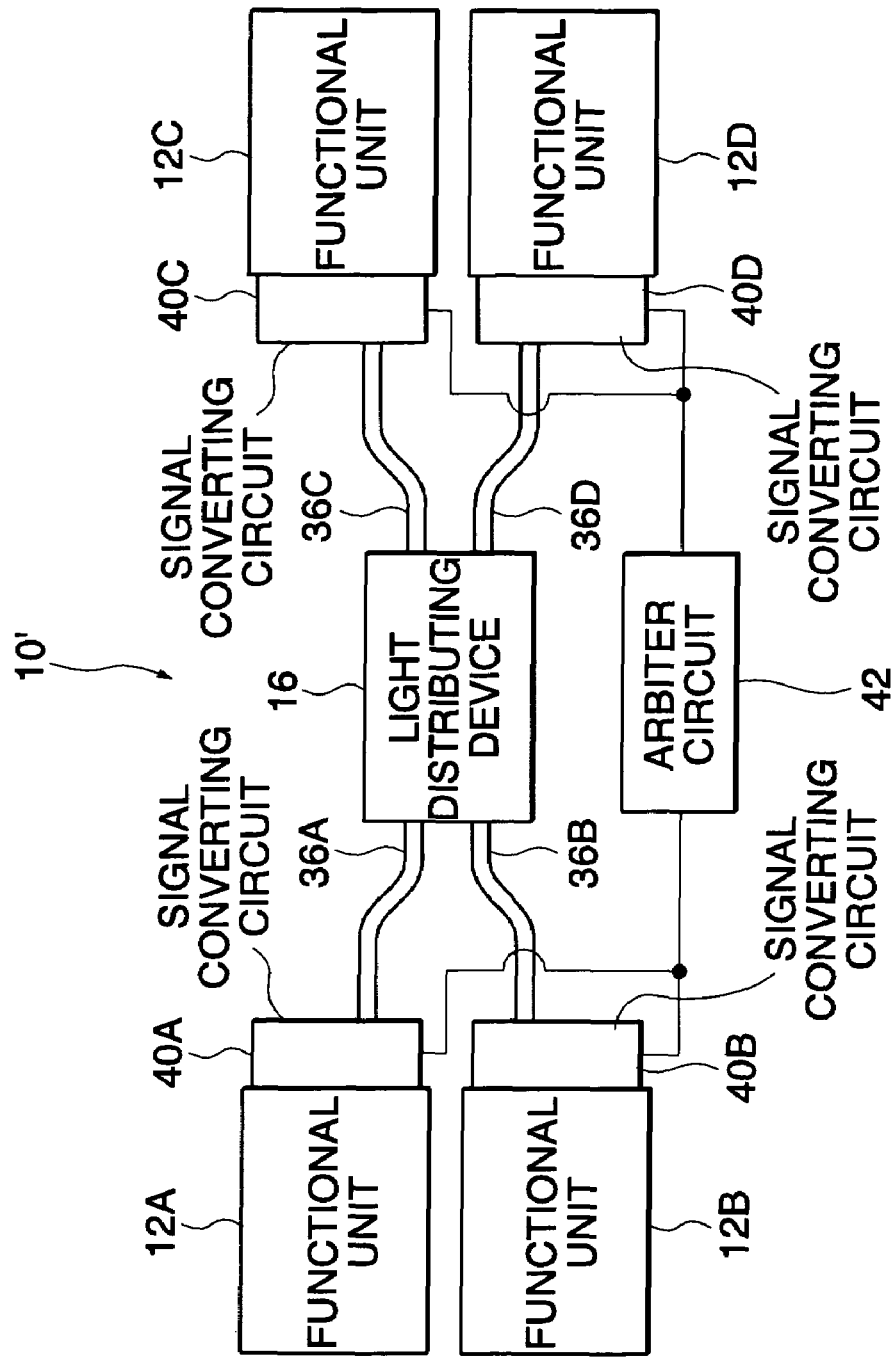

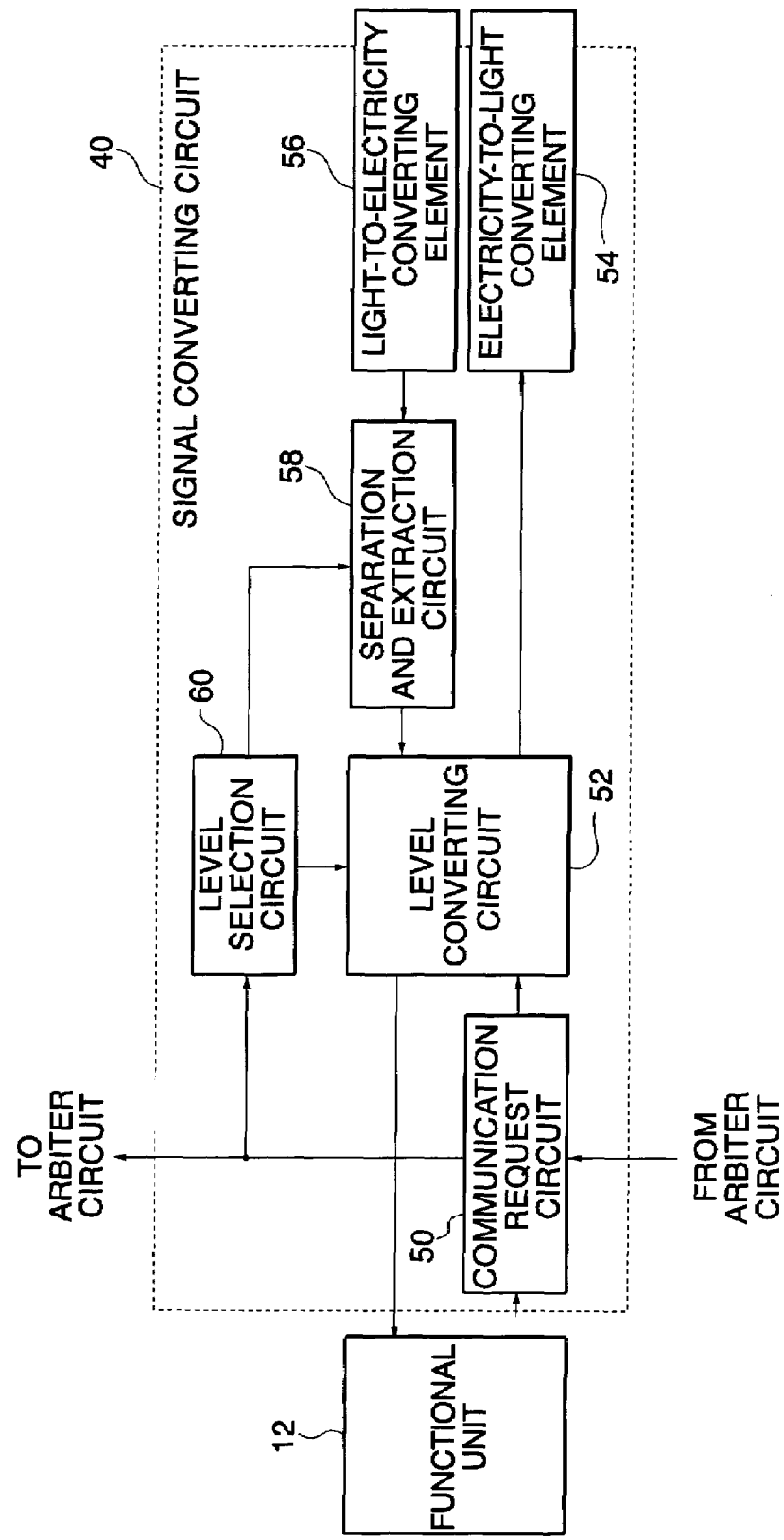

MULTIFUNCTION SYSTEM

BACKGROUND OF THE INVENTION

1. Field of the Invention

The present invention relates to a multifunction system, and more particularly to a multifunction system in which plural functions including an image output function can be used in an identical system.

2. Description of the Prior Art

Recently, there is known a multifunction system in which plural functions such as a copy function, a scanner function, a printer function, and a facsimile function can be used in one apparatus or one system by handling image information as digital signals.

FIG. 13 shows a conceptual diagram of such a multifunction system. In the drawing, an image input terminal (IIT) 100 corresponds to an original reading device; an image output terminal (IOT) 102 corresponds to a printer; and a controller 104 includes an interface for sending and receiving image signals to and from external networks such as the Internet, interfaces with the IIT 100 and the IOT 102, and a storage device (not shown) for storing image information.

The controller 104, which controls system operations such as a print instruction and a scan instruction, has a network interface and a modem to enable data input and output with the outside world, The devices are connected with each other by wiring the number of lines corresponding to the number of bits of an image signal, and are electrically connected with each other by switching signal switching units S1, S2, and S3 provided in wiring paths according to a desired function.

Because of this construction, if a new functional unit is added, an additional switch is required to switch the connections among the functional units, with the result that not only the device configuration becomes complicated but also the wiring must be redesigned.

A recent trend has been toward more and more wired lines because of an increase in the data quantity of image signal attendant on higher image quality. For example, the connection between the IIT 100 and the controller 104 would require plural signal lines for sending pixel data and plural control lines for controlling a printer, so that as many signal lines as the signals would be required, one signal line for each signal. For example, for image data only, a monochromatic printer would require N signal lines to send and receive information of one pixel in N bits, and a color printer would require M by N signal lines when the number of colors per pixel is M.

To solve the above-described problems, there is currently an attempt to increase operation speed and restrain device size by pushing ahead with a parallelism approach by multilayering and miniaturizing connection lines. However, there is a problem in that system processing speed is limited by the transmission speed of parallel signals due to signal delay caused by the capacity between connection wirings and connection wiring resistance. Also, the problem of electromagnetic interference (EMI) caused by highly dense connection wiring greatly impedes an increase in system processing speed.

As the technology for decreasing the number of signal lines, the technology for sending plural types of image data in time division is disclosed in Japanese Published Unexamined Patent Application No. Hei 7-25079. This technology reduces communication speed and cannot fundamentally solve the complexity of inter-device connections.

With improvement in CPU, communication speed, and processing speed of storage devices, there is an increasing demand for the ability to execute the so-called concurrent job of concurrently performing plural functions, e.g., a print function and a scanner function.

However, more complicated device configuration is required to execute concurrent jobs in a multifunction system that employs electric wiring.

In this regard, a description is made with reference to FIG. 13 described previously. Since a copy job (the operation of outputting an image obtained from the IIT 100 from the IOT 102) and a print job (the operation of outputting image information stored in advance in the controller 104 from the IOT 102) are sent to the same image output device (IOT) 102, the operations are controlled so that no event occurs at the same time.

Accordingly, if it is assumed that, e.g., a print job and a scan job (the operation of storing an image obtained from the IIT 100 in a memory of the controller 104) that may be transmitted at the same time are executed at the same time, they must take different paths from each other, as shown in the dotted lines in the drawing.

To send and receive image signals associated with the respective jobs by using an identical path without changes, with the respective jobs divided in time series, they have to be processed while adjusting timing. However, where processing is performed in the time division mode, the processing cannot be rapidly performed because two jobs are processed through synchronous transmission to and from the IOT 102.

Accordingly, using the signal line switching parts S1, S2, and S3, respective wirings may be separated from each other so that they can be used independently. The signal switching parts turn on or off signal transmission according to the jobs. For the copy job, the signal switching unit S1 is turned on, and the signal switching parts S2 and S3 are turned off. For the scan job, the signal switching part S2 is turned on, and the signal switching parts S1 and S3 are turned off. For the print job, the signal switching part S3 is turned on, and the signal switching parts S1 and S2 are turned off. The scan job and the print job can be executed at the same time by turning on the signal switching parts S2 and S3 and turning off the signal switching part S1.

However, this method has a problem in that the signal switching parts must be controlled for each job, and an increase in the number of wirings expands a mounting area.

In recent years, there has been a demand to share as many types of equipment handling digital signals as possible to save office space, so that more functional units tend to be added.

FIG. 14 shows a system in which a FAX controller 106 is provided in addition to the controller 104 of FIG. 13. Where plural controllers are installed in the system, it is apparent that the system becomes complicated as shown in FIG. 14. The FAX controller 106 herein includes a modem (not shown) connected to a telephone line to control PAX transmission, sends images sensed by the IIT 100 by a FAX function, and outputs images received by the FAX function to the IOT 102.

As has been described above, since the functional units are connected using electric wirings in the multifunction system, it is difficult to build a high-speed and expandable system.

As shown in FIG. 15, to reduce EMI and signal delay, a method of replacing electric wirings by optical fibers 108 is conceivable. However, although mere speedup of transmission speed can be achieved, there is no substantial change from the case of electric wirings, so that the complexity of wirings and poor expandability cannot be solved.

Where different jobs are to be executed at the same time in a multifunction system, a system using electric wirings as common signal paths has been afflicted with not only complicated wiring placement but also complicated control of plural signal switching parts, as well as an increase in the number of wirings caused by an increase in the number of bits and larger capacity of processors and image signals, placing a strong constraint on device design.

SUMMARY OF THE INVENTION

The present invention has been made in view of the above circumstances and provides a multifunction system that has advanced functions and high speed capability and is excellent in expandability, and further a multifunction system that is excellent in expandability also for execution of concurrent jobs.

According to an aspect of the present invention, a multifunction system includes: an image output unit that has an image signal input unit capable of receiving an optical signal, and outputs an image according to an optical signal inputted from the image signal input unit; a first functional unit that has a first optical signal output unit capable of outputting an optical signal and outputs the optical signal according to a first function through the first optical signal output unit; a second functional unit that has a second optical signal output unit capable of outputting an optical signal and an optical signal input unit capable of receiving an optical signal, and outputs an optical signal according to a second function through the second optical signal output unit, and receives an optical signal inputted through the second optical signal input unit; and a distribution-type optical signal transmission medium to which the image signal input unit, the first optical signal output unit, the second optical signal output unit, and the optical signal input unit are connected, and which distributes an optical signal outputted from at least the first optical signal output unit to the image signal input unit and the optical signal input unit, and transmits an optical signal outputted from the second optical signal output unit to the image signal input unit.

The multifunction system has plural functions for image data. For example, a function to read an image printed on paper and a function to print the read image are available.

In such a multifunction system, the image output unit has an image signal input unit capable of receiving an optical signal. The image signal input unit includes a light receiving element such as a photodiode. The image output unit outputs an image according to the optical signal inputted from the image signal input unit. An outputted image can be, for example, printed and displayed.

The first functional unit has the first optical signal output unit capable of outputting an optical signal. The first optical signal output unit includes a light emitting element such as a laser diode. The first functional unit has a function to output an optical signal according to the first function through the first optical signal output unit. The first function, for example, senses an image, and shoots an image. Namely, the first functional unit can be an image reading device such as a scanner, a digital camera, and a video camera.

The second functional unit has the second optical signal output unit capable of outputting an optical signal and the optical signal input unit capable of receiving an optical signal. The second optical signal output unit can have the same configuration as the first optical signal output unit, and the optical signal input unit can have the same configuration as the image signal input unit. The second functional unit has a function to output the optical signal according to the second function through the second optical signal output unit, and a function to receive an optical signal inputted through the second optical signal input unit. Namely, the second functional unit can be a controller that, for example, performs proper processing on a received optical signal and outputs the result.

The image signal input unit, the first optical signal output unit, the second optical signal output unit, and the optical signal input unit are respectively connected to the distribution-type transmission medium. The distribution-type transmission medium, which distributes an inputted optical signal to plural locations, is made of a medium having high light transmissivity such as sheet PMMA (polymethyl methacrylate). Such a distribution-type transmission medium at least distributes an optical signal outputted from the first optical signal output unit to the image signal input unit and the optical signal input unit, and transmits an optical signal outputted from the second optical signal output unit to the image signal input unit.

Specifically, for example, the following three processings can be performed at the same time: outputting image data sensed in the first functional unit to the image output unit for printing through the distribution-type optical transmission medium (copy); outputting image data sensed in the first functional unit to the second functional unit for storing through the distribution-type optical transmission medium (scan); and outputting image data outputted from the second functional unit to the image output unit for printing through the distribution-type optical transmission medium (print).

In this way, since plural functional units can be connected to the distribution-type optical transmission medium, wiring placement and control can be prevented from becoming complicated. Communications over optical signals enable high speed communications.

The system may be expanded by connecting functional units having other functions to the distribution-type optical transmission medium. In this way, the system can be easily expanded by connecting functional units to be added to the distribution-type optical transmission medium.

The distribution-type optical transmission medium may be provided with a diffusion part for diffusing inputted optical signals. This enables optical signals to be transmitted to more locations.

The first optical signal output unit and the second optical signal output unit may include a generation part that generates plural optical signals of different types, and the image signal input unit and the optical signal input unit may include an extraction part that extracts optical signals of specific types from inputted optical signals. This enables concurrent communications among plural functional units. As a result, plural different jobs can be executed at the same time, and concurrent jobs can also be rapidly processed.

The plural optical signals of different types may be optical signals with different intensity levels, optical signals with different wavelengths, and optical signals with different timings of output to the optical transmission part.

An arbitrating element is further provided to arbitrate the respective communications of the image output unit, the first functional unit, and the second functional unit, so that communication control can be more properly conducted by specifying the types of optical signals to be outputted by the first optical signal output unit and the second optical signal output unit, and the types of optical signals to be extracted by the image signal input unit and the optical signal input unit.

The image output unit may include a printer, the first functional unit may include an image reading device, and the second functional unit may include at least a storage part to store signals inputted from the optical signal unit. In this case, the first functional unit outputs optical signals for printing an image; the second functional unit stores in the storage part signals according to the optical signals inputted through the optical signal input unit, and outputs optical signals according to the image through the second optical signal output unit; and the image output unit prints the image according to optical signals inputted from the second functional unit through the image signal input unit. In this way, by providing the second functional unit with the storage device, image data sensed by the first functional unit can be stored and printed.

There may be provided a third functional unit having a third optical signal output unit that outputs optical signals according to a third function to the distribution-type optical signal transmission medium. In this case, the first functional unit can output optical signals to the image output unit through the first optical signal output unit, and the third functional unit can transmit optical signals to the second functional unit through the third optical signal output unit. The third functional unit can be an external interface, e.g., a modem through which signals external to the system are received. Thereby, copying can be performed while conducting communications between the outside and the second functional unit.

BRIEF DESCRIPTION OF THE DRAWINGS

Preferred embodiments of the present invention will be described in detail based on the followings, wherein:

FIG. 8 is a schematic diagram of a multifunction system according to a second embodiment;

FIG. 9 is a schematic diagram of a signal converting circuit according to a second embodiment;

DESCRIPTION OF THE PREFERRED EMBODIMENTS

FIRST EMBODIMENT

Hereinafter, a first embodiment of the present invention will be described.

Figure 1:
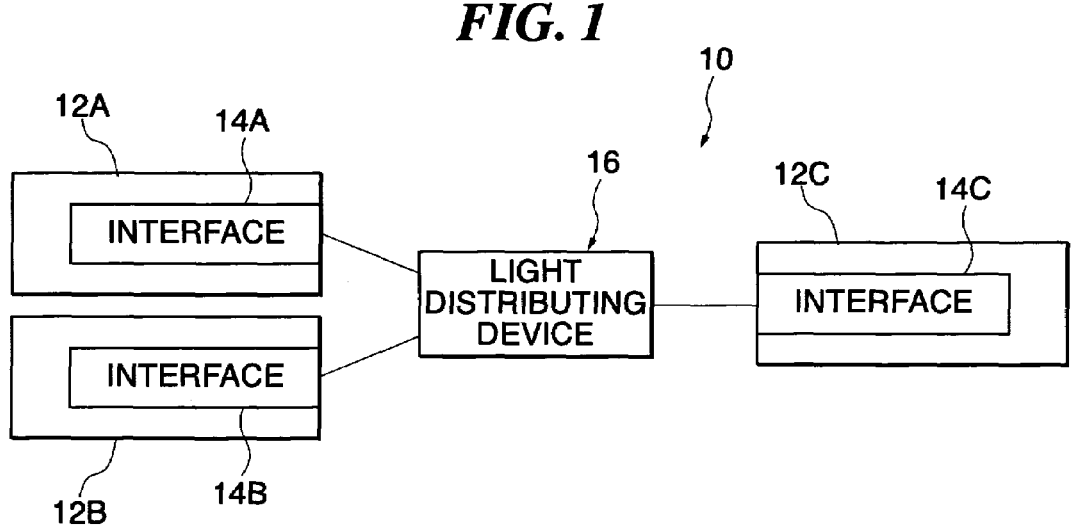
FIG. 1 is a schematic diagram of a multifunction system according to a first embodiment.

FIG. 1 shows a multifunction system 10 according to the present invention. The multifunction system 10 has plural (three in FIG. 1) functional units 12A, 12B, and 12C connected to a light distributing device 16. The functional units 12A, 12B, 12C respectively have interfaces 14A, 14B, 14C for communicating with other functional units through the light distributing device 16.

For example, an optical signal output from interface 14C is guided to the light distributing device 16 by which signal light is branched to the interfaces 14A and 14B. Also, an optical signal from the interface 14A or 14B is similarly guided to the light distributing device 16 and transmitted to the interface 14C.

The light distributing device 16 includes a distribution-type optical signal transmission medium. The distribution-type optical signal transmission medium refers to an optical transmission medium that passively distributes an inputted optical signal and propagates it to an output side. As the distribution-type optical signal transmission medium, for example, a sheet optical data bus disclosed in Japanese Published Unexamined Patent Application Nos. Hei 10-62657 and U.S. Pat. No. 5,822,475 can be used.

Since the optical data bus diffuses signal light entering through a common signal path by a diffusion part to propagate it, it has the following advantages: plural circuit substrates having a light receiving and issuing part can be optically coupled securely by simple attachments; precise optical alignments are unnecessary; the number of circuit substrates and mounting positions can be freely changed; and a highly expandable and highly flexible system can be built.

It also has the environment property of being resistant to dust because of the use of transmission lines and the advantage of being resistant to temperature changes because optical alignments are unnecessary. Although a sheet transmission medium disclosed in U.S. Pat. No. 4,213,670 can also be used in addition to the above-described optical data bus, since it distributes an optical signal by using natural diffusion within the medium, the distance from an incidence part to an emission part of the optical signal must be extended for uniform propagation. In contrast, the above-described system of diffusing signal light by use of the diffusion part is also advantageous in terms of being capable of determining a light amount distribution as desired in an emission part, regardless of a short distance.

Furthermore, a star coupler coupled in branched form by combining plural Y-type channel waveguides according to a distribution ratio can be used. In this case, however, the transmission medium, which requires a high level design, is inferior to the above-described two transmission media in terms of expandability and cost.

Figure 2:
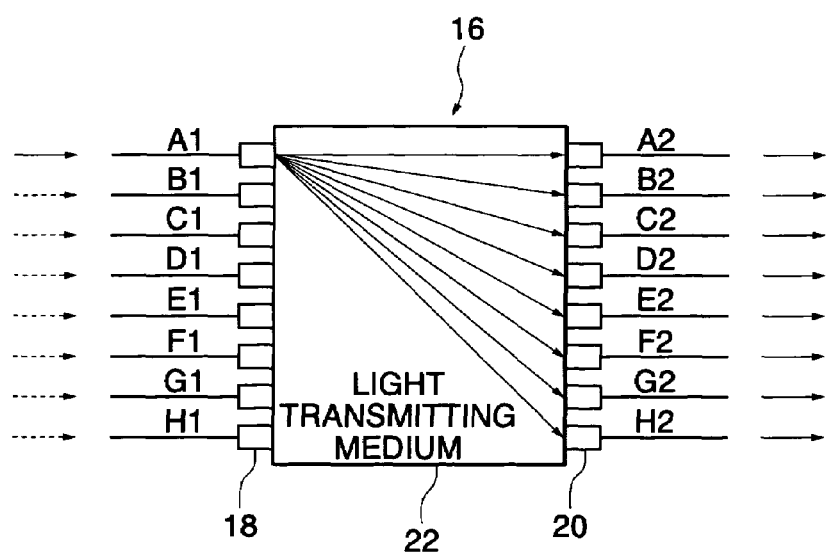
FIG. 2 is a schematic diagram of a light distributing device.

Next, referring to FIG. 2, a concrete operation of the light distributing device 16 will be described. As shown in FIG. 2, functional units A1, B1, C1, D1, E1, F1, G1, H1, A2, B2, C2, D2, E2, F2, G2, and H2 are connected to the light distributing device 16. The functional units A1, B1, C1, D1, E1, F1, G1, and H1 convert an electric signal to be sent (e.g., pixel data signal) into an optical signal by driving a light emitting element 18 such as a laser diode connected to an electricity-to-light converting circuit not shown before inputting the converted optical signal to a light transmitting medium 22. The functional unit A2, B2, C2, D2, E2, F2, G2, and H2 receive the optical signal branched in the light transmitting medium 22 in light receiving elements 20 such as photodiodes connected to a light-to-electricity converting circuit not shown, and converts the optical signal into an electrical signal to perform signal processing, For example, as shown in FIG. 2, signal light incident from the functional unit A1 is transmitted to the functional units A2, B2, C2, D2, E2, F2, G2, and H2 by the light distributing device 16 (this is also true for the functional units B1, C1, D1, E1, F1, G1, and H1). The light distributing device 16 functions as an optical bus that transmits signal light from one functional unit to plural functional units.

Although FIG. 2 shows the case where a signal is transmitted from the functional units A1 (B1, C1, D1, E1, F1, G1, H1) to the functional units A2 (B2, C2, D2, E2, F2, G2, H2), provision of light emitting elements in the functional units A2 (B2, C2, D2, E2, F2, G2, H2) and light receiving elements in the functional units A1 (B1, C1, D1, E1, F1, G1, H1) enables a signal to be transmitted from the functional units A2 (B2, C2, D2, E2, F2, G2, H2) to the functional units A1 (B1, C1, D1, E1, F1, G1, H1).

The functional units are functional areas such as control units, and storage devices, IIT (image input terminal), IOT (image output terminal), and other apparatuses such as scanner and digital camera, and image processing circuit substrates and operation circuit substrates.

Figure 3:
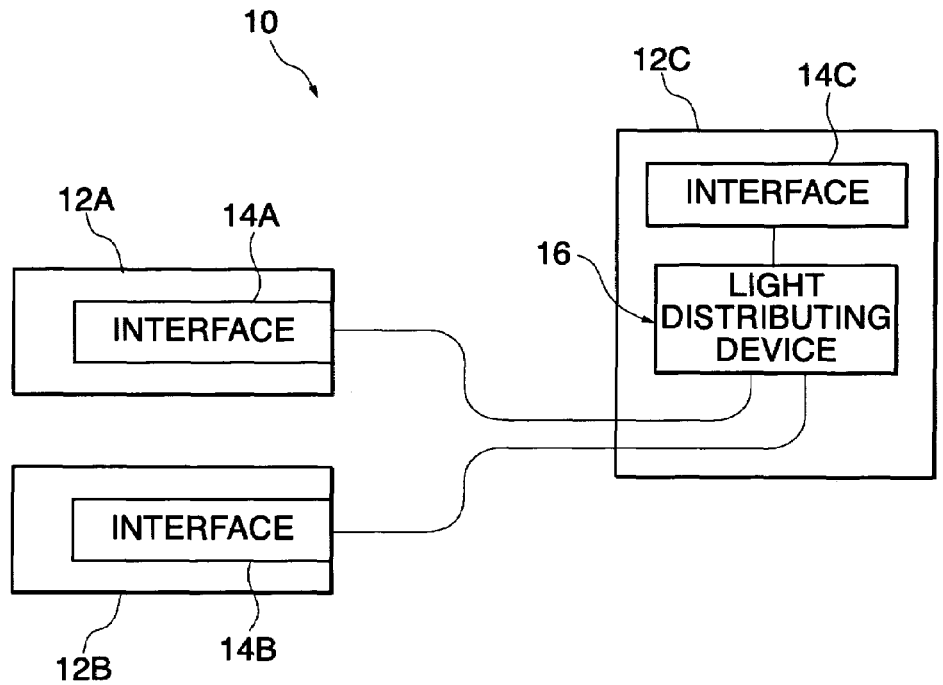
FIG. 3 is a schematic diagram of a multifunction system in which a light distributing device is provided within a functional unit.

As shown in FIG. 3, the light distributing device 16 may be provided, e.g., inside the functional unit 12C.

Figure 4:
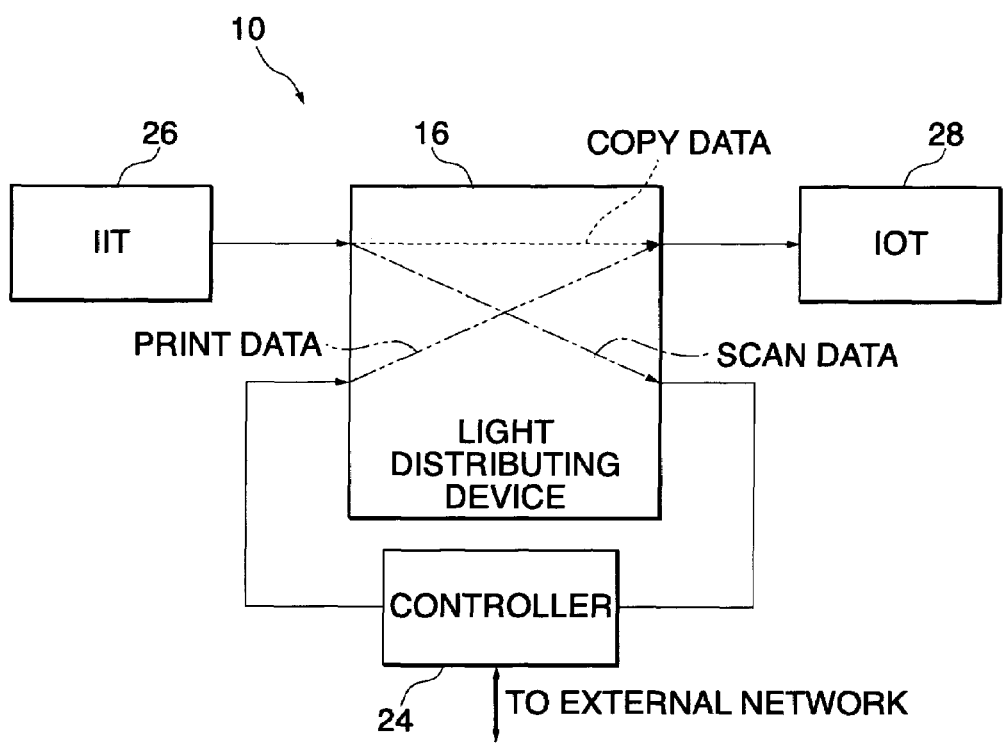
FIG. 4 is a concrete configuration diagram of a multifunction system.

FIG. 4 shows a concrete configuration of the multifunction system 10. In the multifunction system 10 shown in FIG. 4, a controller 24, an ITT 26, and an IOT 28 are connected to the light distributing device 16.

Figure 5:
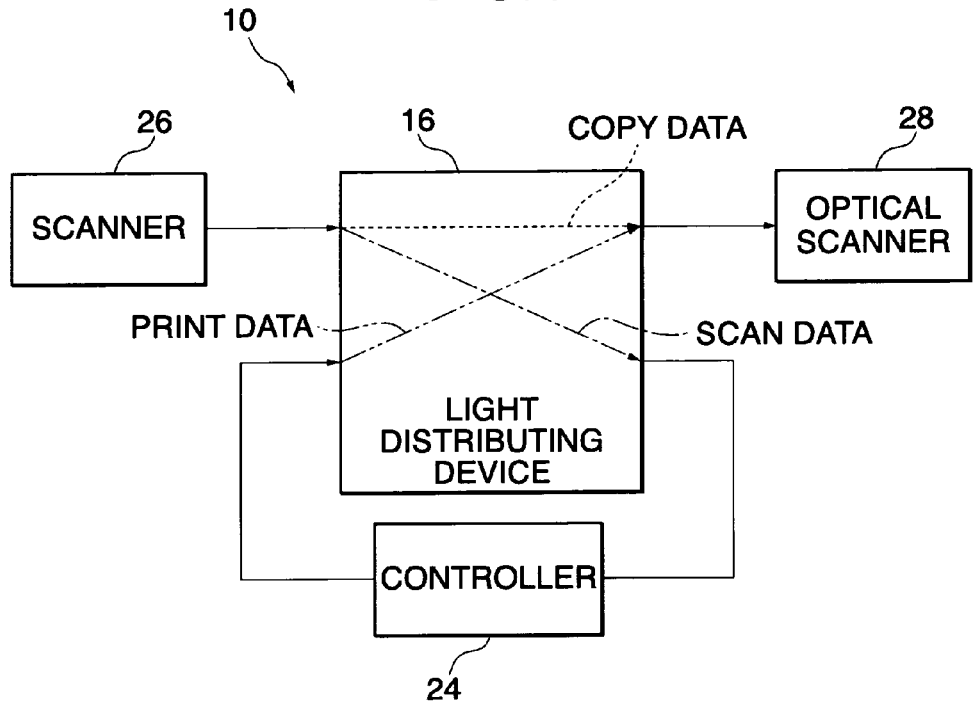
FIG. 5 is a concrete configuration diagram of a multifunction system.

The controller 24, which controls the operation of the system by print, scan, and other instructions, has a network interface and a modem not shown and can input and output data to and from the outside. The ITT 26, as shown in FIG. 5, is e.g., a scanner, and the. IOT 28 is an optical scanner or an ink jet head.

Next, as the action of the first embodiment, signal transmission in the multifunction system 10 shown in FIG. 5 is described.

For example, for a print job, print data outputted from the controller 24 is converted into optical signals, which enter the light distributing device 16. The incident light is branched and transmitted to an optical scanner 28 of an emission side. The optical scanner 28 receives the data, for example, forms a latent image corresponding to an image on a photoreceptive material, and develops it by toner to print a resulting image onto paper.

For a copy job, copy data outputted from the scanner 26 is converted into optical signals, which enter the light distributing device 16. The incident light is branched and transmitted to the optical scanner 28 of an emission side. The optical scanner 28 receives the data, for example, forms a latent image corresponding to an image on the photoreceptive material as described above, and develops it by toner to print a resulting image onto paper.

For a scan job, scan data outputted from the scanner 26 is converted into optical signals, which enter the light distributing device 16. The incident light is branched and transmitted to the controller 24 of an emission side. The controller receives the data and captures an image.

Next, in the multifunction system 10 shown in FIG. 4, a description is made of a concurrent job that performs a scan job while executing, e.g., a print job.

In the concurrent job, the operation of outputting predetermined image information held in the controller 24 from the IOT 28 is performed concurrently with the operation of storing other image information obtained from the IIT 26 in memory. The multifunction system 10 functions as a network printer when the controller 24 is connected to an outside network, and functions as a facsimile when connected with a telephone line.

At this time, the light distributing device 16 transmits plural pieces of data at the same time by multiplexing signals so that the mutual pieces of data can be separated in transmission destinations, that is, receiving sides, whereby a concurrent job can be implemented.

As described previously, to execute a concurrent job by electric pulses, plural switches must be used to switch transmission lines or send data in time division mode. On the other hand, the present invention enables multiple transmissions with a switch-free simple construction and without having to increase transmission frequencies. A specific method of multiplexing signals will be described later.

Next, concurrent execution of a copy job and a scan job is described.

The two jobs, which transmit image data captured from the ITT 26, can be executed concurrently by broadcasting same signals to the IOT 28 and the controller 24 from the ITT 26. Although the broadcast transmission can be achieved by using electric buses, where optical fibers are used, it cannot be achieved without a one-for-one connection between corresponding apparatuses by use of plural optical fibers. However, the present invention achieves broadcast transmission by use of one light distributing device 16.

Figure 6:
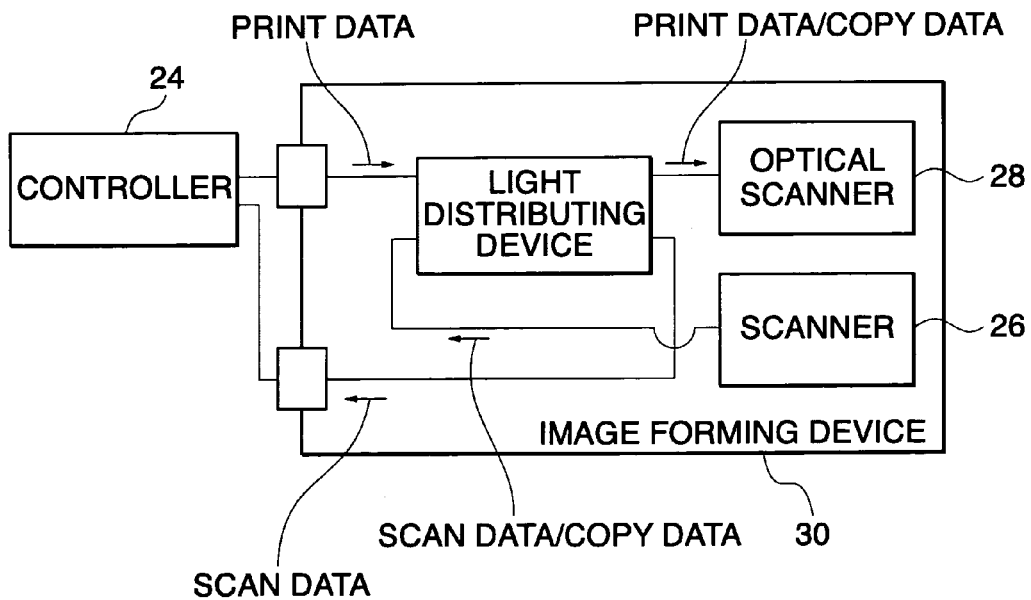
FIG. 6 is a configuration diagram of a multifunction system 10 in which an image forming device and a controller are placed separately from each other.

FIG. 6 shows an example of a multifunction system 10 in which an image forming device 30 including an optical scanner 28, a scanner 26, and a light distributing device 16, and a controller 24 are connected. The multifunction system 10 shown in FIG. 6 is a system satisfying the demand to place the image forming device 30 physically separately from the controller 24 within an office floor.

This system will use expensive cables because it is greatly influenced by a transmission delay due to the parasitic capacity of cables in transmission over electric buses. However, where wiring is made by optical buses as in the present invention, a transmission distance can be easily increased.

Figure 7A:
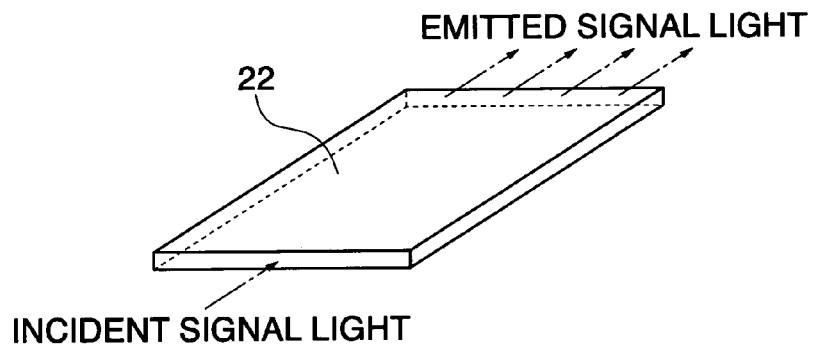
FIGS. 7A to 7D illustrate a concrete example of a light distributing device.

For the light transmitting medium 22 used in the light distributing device 16, a sheet light transmitting medium as shown in FIG. 7A can be used. Clad layers (not shown) smaller in refractivity than the light transmitting medium 22 can be disposed on the upper and lower surfaces and at each side of the light transmitting medium 22. For the light transmitting medium 22, plastic materials, inorganic glass, or the like such as e.g., polymethyl methacrylate, polycarbonate, and amorphous polyolefin can be used.

Figure 7B:
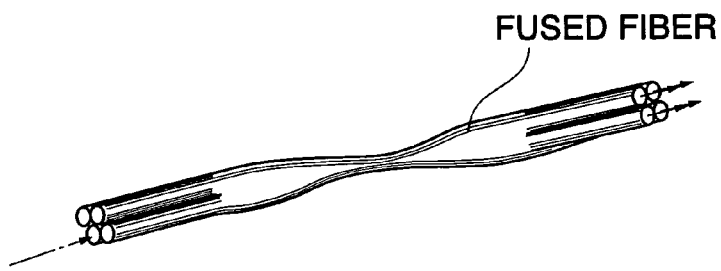

Also, for the light transmitting medium 22, the above-described branch waveguide and a fused fiber as shown in FIG. 7B can be used.

Figure 7C:
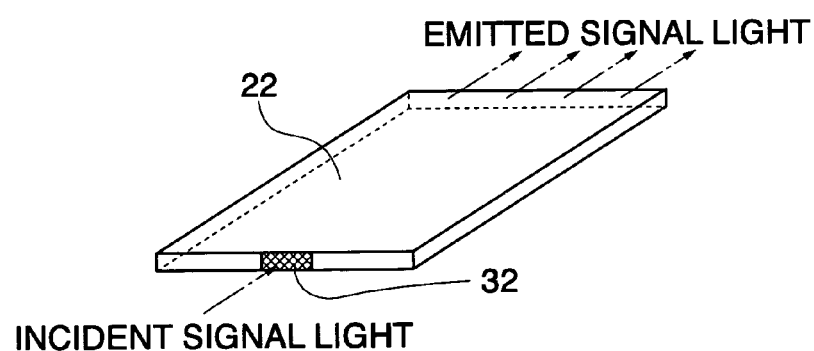

A diffusion part may be formed on the signal light incidence face of the light transmitting medium 22, as shown in FIG. 7C. In the diffusion part 32, e.g., a beam shaping defuser (LSD (made by Physical Optics Corporation)) can be used.

Figure 7D:
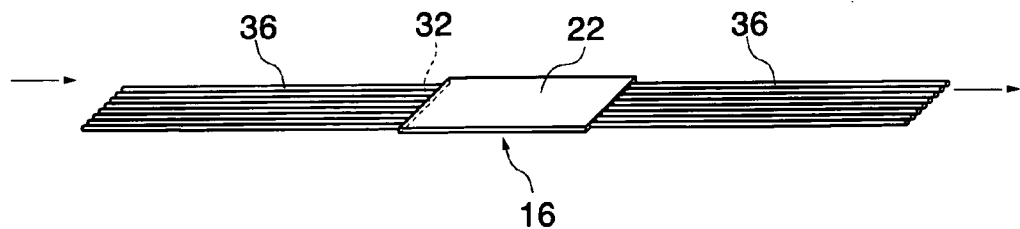

As shown in FIG. 7D, the light distributing device 16 may include the sheet light transmitting medium 22 and an optical fiber 36.

SECOND EMBODIMENT

Hereinafter, a second embodiment of the present invention will be described.

FIG. 8 shows a multifunction system 10' according to this embodiment. The same units as the multifunction system 10 described in the first embodiment are identified by the same reference numerals, and detailed descriptions of them are omitted.

In the multifunction system 10' shown in FIG. 8, functional units 12A, 12B, 12C, and 12D respectively include signal converting circuits 40A, 40B, 40C, and 40D that convert electric signals into optical signals.

The signal converting circuits 40A to 40D are respectively connected to the light distributing device 16 through optical fibers 36A to 36D. Electric signals outputted from the functional units 12A to 12D are converted into optical signals by the signal converting circuits 40A to 40D, and the optical signals are guided to the light distributing device 16 by the optical fibers 36A to 36D.

To the signal converting circuits 40A to 40D, an arbiter circuit 42 for arbitrating communications between the functional units 12A to 12D is connected. Although, in FIG. 8, the arbiter circuit 42 is separated from the functional units 12A to 12D for the purpose of clarifying individual functions, the present invention is not limited to this configuration; the arbiter circuit 42 may be included in a signal converting circuit of any of the functional units.

Accordingly, the interface 14 shown in FIG. 1 corresponds to the signal converting circuits shown in FIG. 8 or a circuit including both the signal converting circuits and an arbiter circuit. The signal converting circuits 40A to 40D, which convert electric digital signals (1 or 0) into optical ON/OFF signals, can change the property of light to be converted into and thereby can output optical signals without interference from each other when the respective functional units 12A to 12D send signals at the same time, as described later.

Where optical signals are outputted from plural functional units 12 at the same time, the optical signals guided to the light distributing device 16 are synthesized in the light distributing device 16. The optical signals are inputted to optical fibers 36 to which opposite functional units 12 are connected, and enter the signal converting circuits 40 connected to the functional units 12.

For example, where the functional unit 12A sends data to the functional unit 12C, the functional unit 12A, which is a communication source, outputs a communication request signal indicative of a request to communicate with the functional unit 12C, which is a communication destination, to the arbiter circuit 42. The arbiter circuit 42 checks the current use status of the light distributing device 16, that is, a communication status and the status of the functional unit 12C specified by the functional unit 12A, and outputs a reply signal indicative of communication approval or communication reject to the functional unit 12A.

The arbiter circuit 42, when giving communication approval, sends a communication approval signal and a signal for specifying the type of an optical signal used for communication to the requesting functional unit 12A, and at the same time sends a communication standby signal for indicating transition to a communication standby state and a signal for specifying the type of an optical signal to be received to the signal converting circuit 40C of the functional unit 12C. Upon receipt of the communication standby signal from the arbiter circuit 42, the functional unit 12C goes into a reception standby state.

The term "reception standby state" refers to a state in which setting has been made to separate and extract a signal to a functional unit of interest from optical signals sent through the light distributing device 16, that is, a state in which an optical signal of a type specified by the arbiter circuit 42 can be received. Since plural communications may be performed at the same time because of communications between other functional units, plural signals entering the signal converting circuit 40C may be superimposed. The signal converting circuit 40C performs setting for receiving a signal directed to it.

Thereby, from an optical signal, synthesized with other functional units 12, sent from the functional unit 12A, which is a communication source, only an optical signal from the communication source is separated and extracted by the signal converting circuit 40C, is converted into an electric signal, and is inputted to the functional unit 12C of the communication destination. An attempt to send a signal to plural other functional units at the same time can be achieved by sending respective communication request signals and signals for specifying the types of optical signals used for communication to the arbiter circuit 42 in the same as described above. Thereby, the arbiter circuit 42 sends respective communication standby signals and signals for specifying the types of optical signals to be received to the plural other functional units specified as communication destinations. In this way, plural communications can be easily achieved at the same time.

Next, a detailed configuration of the signal converting circuit is described.

FIG. 9 shows a signal converting circuit 40 that converts an electric signal into an optical signal of a different intensity level and sends the converted signal.

The signal converting circuit 40 has: a communication request circuit 50 that exchanges communication requests with the arbiter circuit 42; a level converting circuit 52 that converts the level of an inputted signal; an electricity-to-light converting element 54 that converts an electric signal into an optical signal; a light-to-electricity converting element 56 that converts a received optical signal into an electric signal; a separation and extraction circuit 58 that separates and extracts only a specified signal from signals with superimposed intensities; and a level selection circuit 60 that specifies a intensity level to be extracted for the separation and extraction circuit 58.

The electricity-to-light converting element 54 includes, e.g., a light emitting diode (LED), a laser diode (LD), and the like. The light-to-electricity converting element 56 includes, e.g., a photodiode (PD). A light guiding part such as an optical fiber 36 is connected to the electricity-to-light converting element 54 and the light-to-electricity converting element 56.

The level converting circuit 52 converts the level of an electric signal outputted from a functional unit 12 and outputs the converted signal to the electricity-to-light converting element 54, or converts the level of a signal separated and extracted in the separation and extraction circuit 58 into the level of the original electric signal and outputs the converted signal to the functional unit 12.

When the signal converting circuit 40 thus configured receives an electric signal to be communicated from the functional unit 12, the communication request circuit 50 sends a communication request signal to the arbiter circuit 42 along with the address of a functional unit of communication destination. The communication request circuit 50 receives a communication approval signal from the arbiter circuit 42 and at the same time receives an indication of the intensity level of an optical signal used for the communication from the arbiter circuit 42, which is sent to the level selection circuit 60. The level selection circuit 60 directs the level converting circuit 52 to send the electric signal at the indicated intensity level.

The level converting circuit 52 converts the level of the electric signal outputted from the functional unit 12 into the intensity level indicated by the level selection circuit 60 and outputs the converted signal to the electricity-to-light converting element 54. The electricity-to-light converting element 54 converts it into an optical signal and sends the converted signal to the optical fiber 36.

On the other hand, where an optical signal is received, the communication request circuit 50 receives an indication of a intensity level of the optical signal used for communication from the arbiter circuit 42, which is sent to the level selection circuit 60. The level selection circuit 60 directs the separation and extraction circuit 58 to separate and extract only a signal of the indicated intensity level from received signals.

A signal received from the optical fiber 36 is converted from an optical signal into an electric signal in the light-to-electricity converting element 56. On the signal, send signals to other functional units may be superimposed. For this reason, the separation and extraction circuit 58 fetches only a signal of an intensity level specified in the level selection circuit 60.

Since optical signals of different intensity levels are superimposed on top of one another, an example described below assumes that signals with a multiplicity of 2 and intensity levels 1 and 2 coexist. Specifically, for example, an optical signal with a intensity level of 0 or 1 is emitted from a functional unit 12A, and an optical signal with a intensity level of 0 or 2 is emitted from another function unit 12B. Since the intensity levels of optical signals are simply added in the light distributing device 16, a signal level that can be received in a light receiving side is 0, 1, 2, or 3. Accordingly, a table as shown in Table 1 below is prepared in advance, and by referring to it, only a signal component from a functional unit of a sending source that sends data to a functional unit of interest can be extracted from a synthesized signal.

TABLE 1

| FUNCTIONAL UNIT 12A | FUNCTIONAL UNIT 12B | SYNTHESIZED INTENSITY |
|---|---|---|
| 0 | 0 | 0 |
| 1 | 0 | 1 |
| 0 | 2 | 2 |
| 1 | 2 | 3 |

The intensity level of the signal sent from the functional unit 12 of a sending source is determined by the arbiter circuit 42 from a communication state at that point, as described previously, is reported to the level selection circuit 60, and further to the separation and extraction circuit 58. The separation and extraction circuit 58 refers to the above-described table and extracts only a signal of a specified intensity from a signal of synthesized intensities. The extracted signal is again converted into the level of the original electric signal in the level converting circuit 60 and sent to the functional unit 12 of a sending destination.

Although a description has been made of the case of a multiplicity of 2, the present invention is not limited to this and allows a greater multiplicity. Generally, for a multiplicity of N (N is a positive integer), intensity levels 1, M, $M^2 \ldots M^{N-1}$ (M is an integer of 2 or greater) may be used for communications.

In this way, by connecting the functional units by the light distributing device and changing the intensity level of light used for communications, communications can be performed at the same time among plural functional units. Therefore, different jobs can be executed at the same time, and concurrent jobs can also be rapidly processed. By increasing a signal multiplicity, a system can be easily expanded without complicated wiring arrangements and complicated control, unlike conventional systems in which electrical wiring has been used as common signal paths.

THIRD EMBODIMENT

Next, a third embodiment of the present invention is described. In the third embodiment, another example of the signal converting circuit is described. The same units as the multifunction system 10 shown in FIG. 9 are identified by the same reference numerals, and detailed descriptions of them are omitted.

Figure 10:
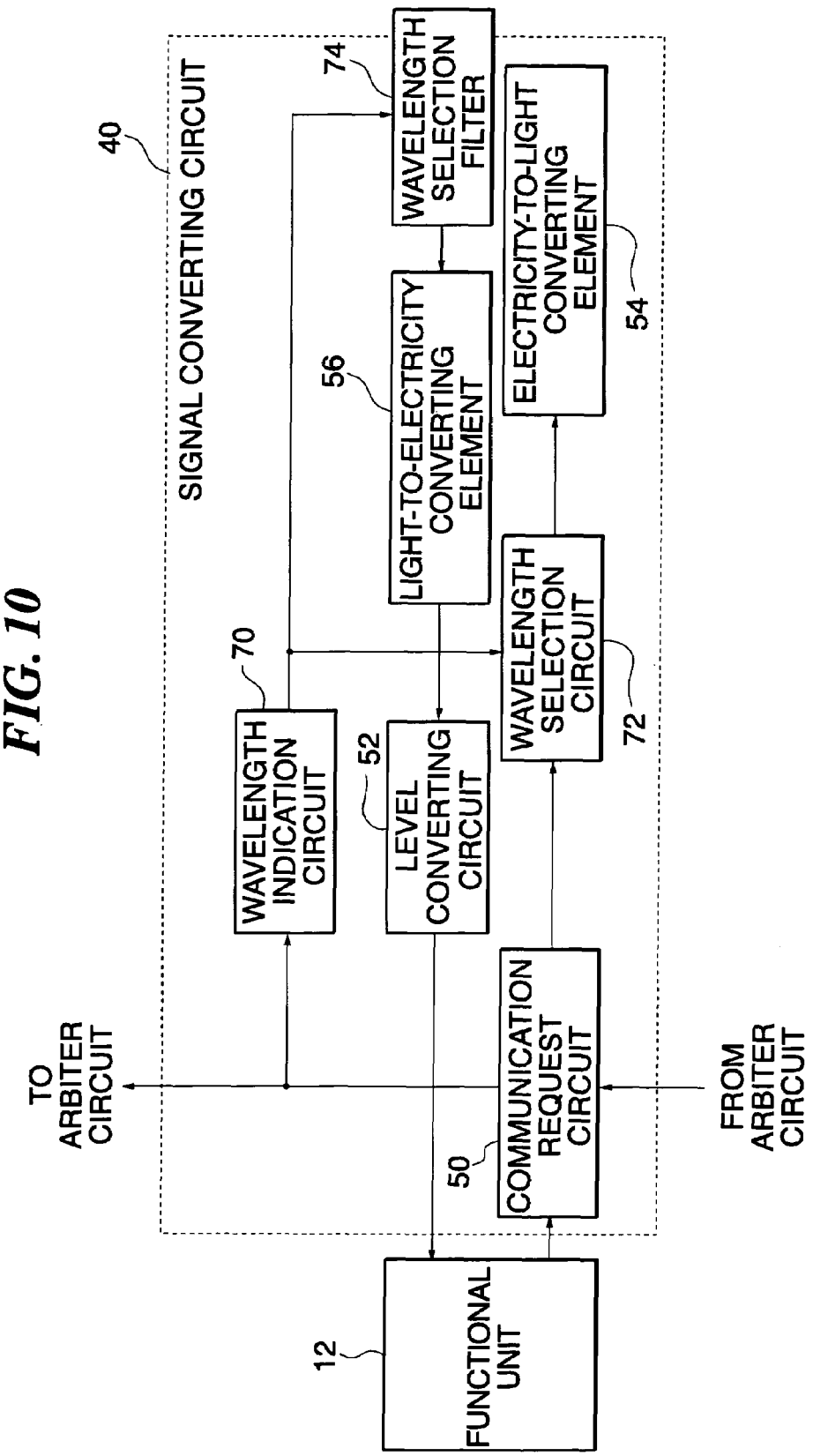
FIG. 10 is a schematic diagram of a signal converting circuit according to a third embodiment.

The signal converting circuit 40 shown in FIG. 10 enables communications among plural functional units by changing light wavelengths. It includes a communication request circuit 50, a level converting circuit 52, an electricity-to-light converting element 54, a light-to-electricity converting element 56, a wavelength indication circuit 70, a wavelength selection circuit 72, and a wavelength selection filter 74.

When the signal converting circuit 40 thus configured receives an electric signal to be communicated from a functional unit 12, the communication request circuit 50 sends a communication request signal to the arbiter circuit 42 along with the address of a functional unit of communication destination. The communication request circuit 50 receives a communication approval signal from the arbiter circuit 42 and at the same time receives an indication of the wavelength of an optical signal used for the communication from the arbiter circuit 42, which is sent to the wavelength selection circuit 72. The electric signal outputted from the functional unit 12 is converted into an optical signal of a wavelength selected in the wavelength selection circuit 72 by the electricity-to-light converting element 54, and is sent to an optical fiber or the like.

An optical signal of a different wavelength may be generated using a method described below. Specifically, plural light emitting elements with different originating wavelengths are provided, and from them, a light emitting element that emits light of a wavelength indicated by the arbiter circuit 42 is selectively driven. Alternatively, a light emitting element that can emit light of plural wavelengths is used, and driving conditions are changed by the wavelength selection circuit 72 so as to emit light of a wavelength indicated by the arbiter circuit 42.

On the other hand, where an optical signal is received, the communication request circuit 50 receives an indication of a wavelength of the optical signal used for communication from the arbiter circuit 42, which is sent to the wavelength indication circuit 70. The wavelength indication circuit 70 sets the wavelength selection filter 74 to transmit only light of the indicated wavelength.

The wavelength selection filter 74, which transits only light of a specified wavelength, may include plural filters for different transmission wavelengths or use such a filter as to allow only light of a specified wavelength to transmit by changing driving conditions. Light received from the optical fiber 36 is inputted to the wavelength selection filter 74, and only light of a wavelength specified in the arbiter circuit 42 is transmitted.

The optical signal is converted into an electric signal by the light-to-electricity converting element 56. The converted signal is again converted into the level of the original electric signal by the level converting circuit 52 and sent to the functional unit 12 of a sending destination.

In this way, by connecting the functional units by the light distributing device and changing light wavelengths, communications can be performed at the same time among plural functional units. Therefore, different jobs can be executed at the same time, and concurrent jobs can also be rapidly processed. By increasing selectable signal wavelengths, a system can be easily expanded without complicated wiring arrangements and complicated control, unlike conventional systems in which electrical wiring has been used as common signal paths.

THIRD EMBODIMENT

Next, a fourth embodiment of the present invention is described. In the fourth embodiment, another example of the signal converting circuit is described. The same units as the multifunction system 10 shown in FIG. 9 are identified by the same reference numerals, and detailed descriptions of them are omitted.

Figure 11:
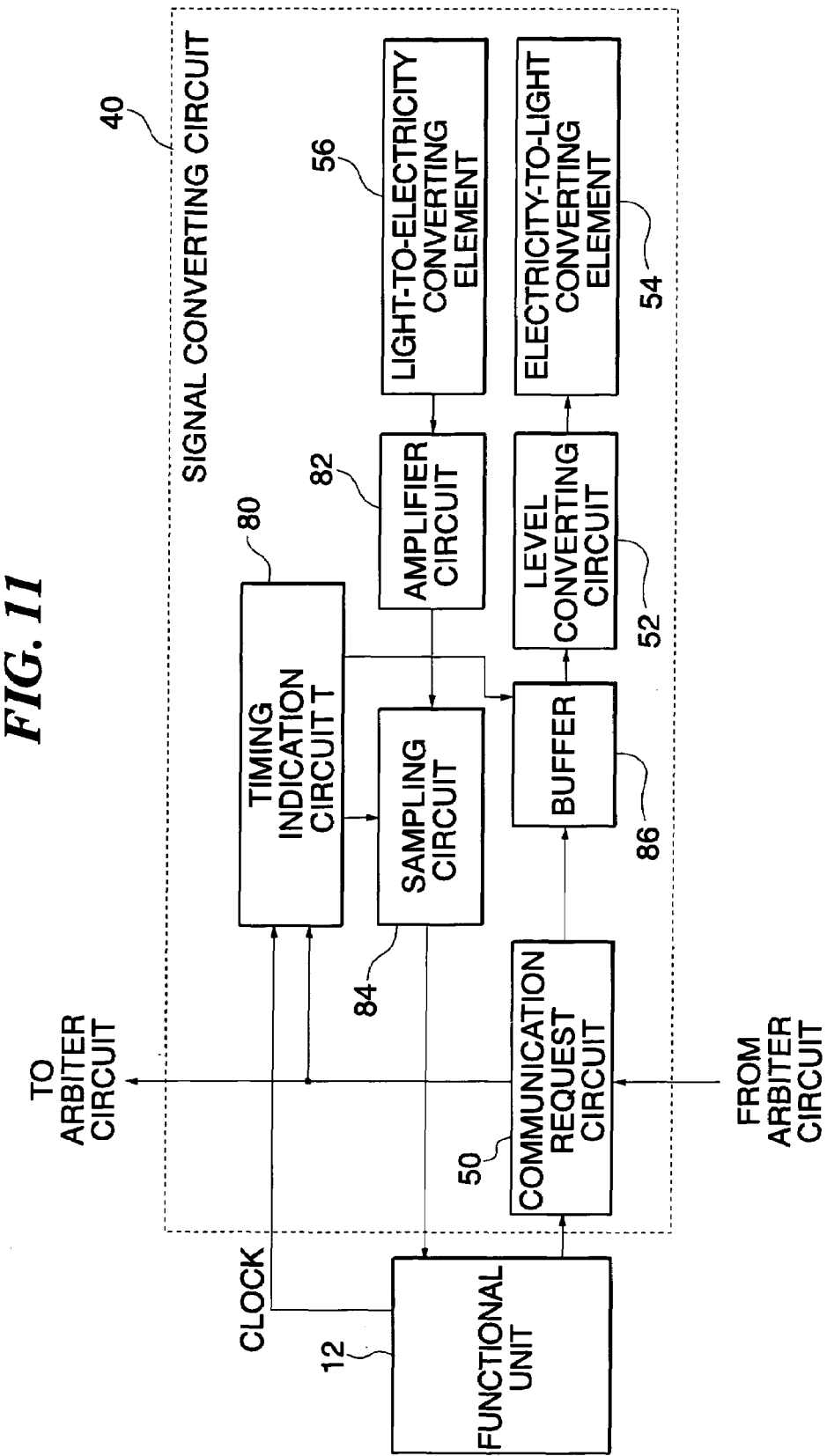
FIG. 11 is a schematic diagram of a signal converting circuit according to a fourth embodiment.

The signal converting circuits 40 shown in FIG. 11, which enables communications among plural functional units by sending an optical signal in time division multiplexing mode, includes a communication request circuit 50, a level converting circuit 52, an electricity-to-light converting element 54, a light-to-electricity converting element 56, a timing indication circuit 80 that generates a clock for indicating a send/receive timing from a clock inputted from the outside, an amplifier circuit 82 that amplifies a signal from the electricity-to-light converting element 54 and adjusts the level of the electric signal, a sampling circuit 84 that fetches data from the signal amplified by the amplifier circuit 82 at a timing indicated by the timing indication circuit 80, and a buffer 86 for adjusting the timing of sending data.

Figure 12:
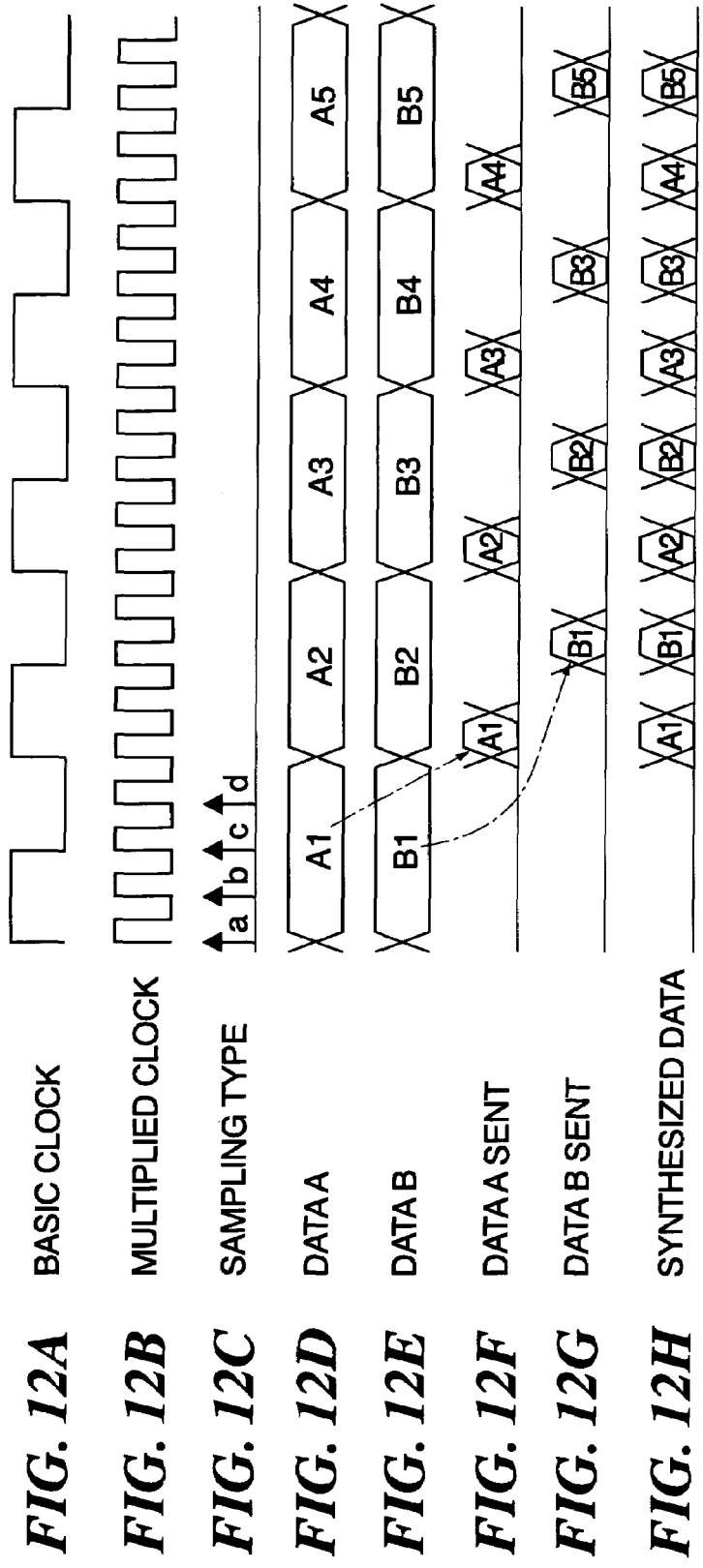
FIGS. 12A to 12H are timing charts showing signal timings according to a fourth embodiment.
Figure 13:
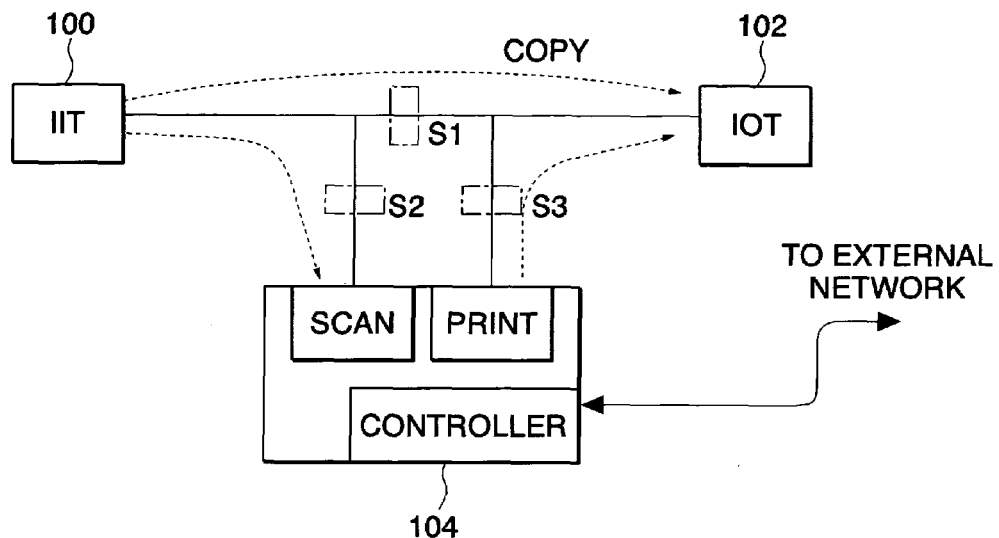
FIG. 13 is a schematic diagram of a conventional multifunction system.
Figure 14:
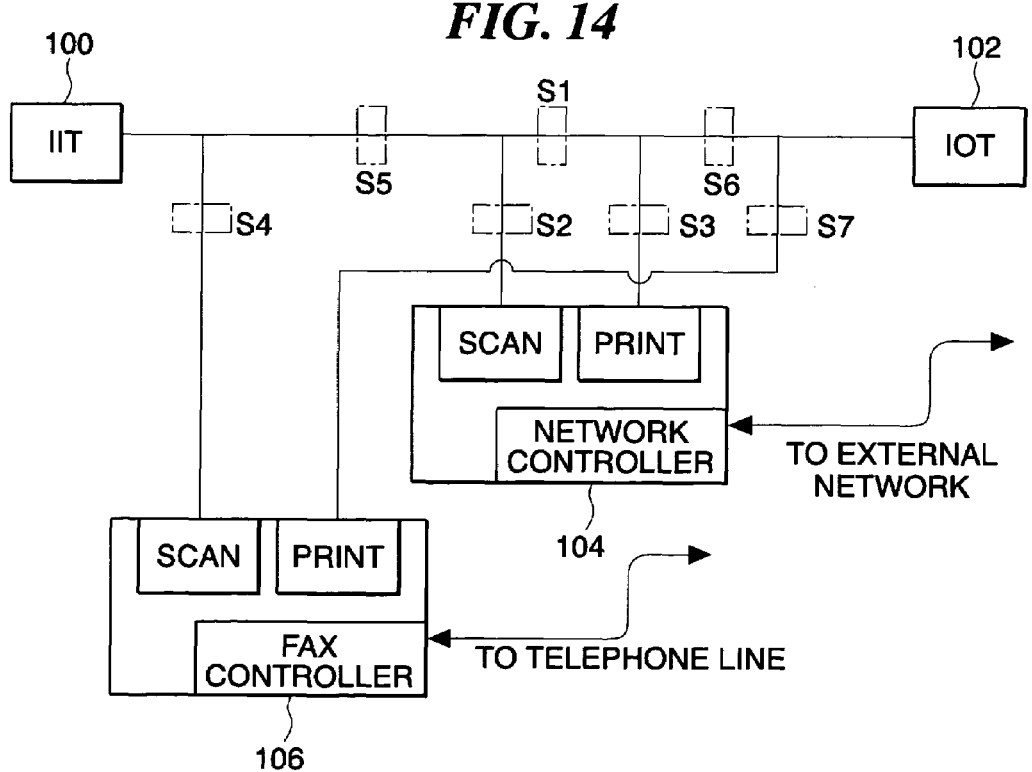
FIG. 14 is a schematic diagram of a conventional multifunction system.
Figure 15:
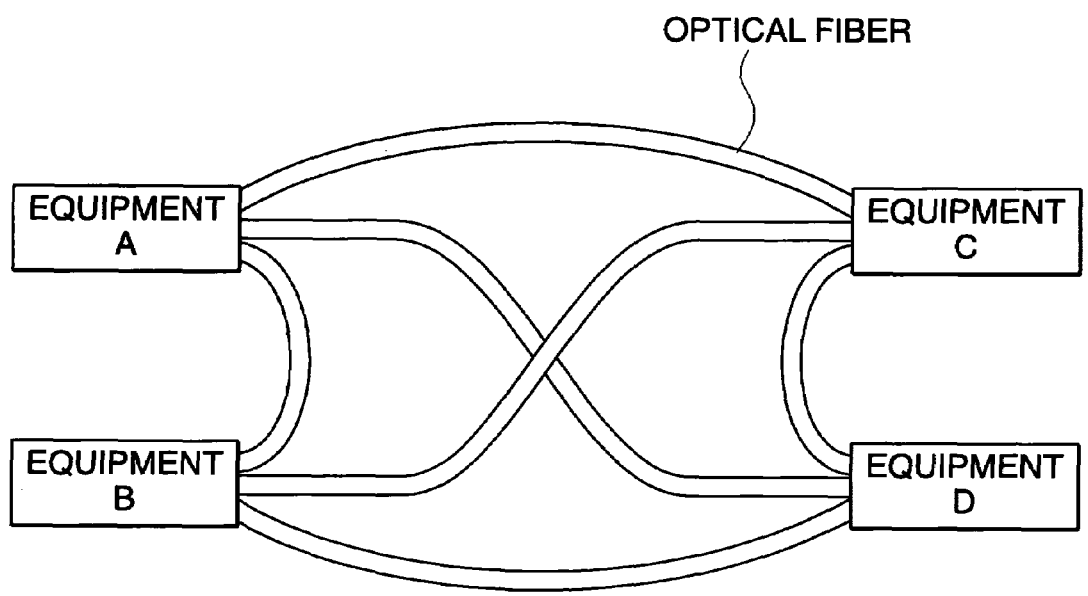
FIG. 15 is a schematic diagram of a conventional multifunction system.

Next, the timing of sending data is described referring to a timing chart shown in FIG. 12.

The functional unit 12 outputs a clock synchronous with send data as shown in FIG. 12A to the timing indication circuit 80. The timing indication circuit 80 uses the clock as a basic clock and generates a clock that the basic clock is multiplied, e.g., four times, as shown in FIG. 12B. Namely, the timing indication circuit 80 creates four timings of sending data by generating a quadruple clock of the basic clock.

If the functional unit 12A and the functional unit 12B performs sending at the same time, upon receipt of communication requests from the respective functional units 12, the arbiter circuit 42 directs the respective communication request circuits 50 so that the functional unit 12A uses a timing a shown in FIG. 12C and the functional unit 12B uses a timing c.

Thereby, the communication request circuit 50 reports the fact to the timing indication circuit 80. The timing indication circuit 80 outputs a timing signal to the buffer 86 at an indicated timing.

The buffer 86 in which data sent from the functional unit 12A is temporarily stored outputs data. A synchronously with the timing signal, that is, the timing a to the level converting circuit 52 as shown in FIG. 12F. The time the buffer 86 outputs one data item A1 is, as shown in FIG. 12F, a fourth the time the functional unit 12A shown in FIG. 12D outputs the data item A1, that is, a fourth the cycle of the basic clock.

The signal outputted from the buffer 86 is converted into a signal of a proper level by the level converting circuit 52, converted into an optical signal by the electricity-to-light converting element 54, and outputted to the optical fiber 36. The signal is inputted to the light distributing device 16.

On the other hand, data B temporarily stored in the buffer 86 of the functional unit 12B is outputted to the level converting circuit 52, as shown in FIG. 12G, synchronously with the timing b according to an indication from the timing indication circuit 80 in the same way as described above. The time the buffer 86 outputs one data item B1 is, as shown in FIG. 12G, a fourth the time the functional unit 12A shown in FIG. 12E outputs one data item B1.

The signal outputted from the buffer 86 is converted into a signal of a proper level by the level converting circuit 52, converted into an optical signal by the electricity-to-light converting element 54, and outputted to the optical fiber 36. The signal is inputted to the light distributing device 16.

In this way, the two data items, the data A and data B, are outputted at the same time and synthesized in the light distributing device 16, and are transmitted to a communication destination as synthesized data as shown in FIG. 12H.

On the other hand, to the communication destination, prior to the communication, the timing of capturing data is reported from the arbiter circuit 42. Namely, the timing is reported to the sampling circuit 84 through the communication request circuit 50 and the timing indication circuit 80. The optical signal received in the light-to-electricity converting element 56 is converted into an electric signal and amplified to a proper level by the amplifier circuit 82, and then inputted to the sampling circuit 84. In the sampling circuit 84, data is acquired at an appropriate timing indicated by the timing indication circuit 80. In this way, data can be sent in time division mode using a clock having a higher frequency than the basic clock, so that communications among plural functional units can be performed at the same time without impairing the capability of high speed.

In this way, by connecting the functional units by the light distributing device and sending optical signals in time division multiplexing mode, communications can be performed at the same time among plural functional units. Therefore, different jobs can be executed at the same time, and concurrent jobs can also be rapidly processed. By increasing the timing of sending and receiving data, a system can be easily expanded without complicated wiring arrangements and complicated control, unlike conventional systems in which electrical wiring has been used as common signal paths.

As has been described above, according to the present invention, a high-speed and expandable multifunction system can be built, system development can be easily conducted, and a system having a concurrent job function can be easily configured.

The entire disclosure of Japanese Patent Application No. 2000-159233 filed on May 29, 2000 including specification, claims, drawings and abstract is incorporated herein by reference in its entirety.

What is claimed is:

1. A multifunction system comprising:
   an image output unit that has an image signal input unit capable of receiving an optical signal, and outputs an image according to an optical signal inputted from the image signal input unit, the image output unit and the image signal input unit being disposed within a first housing;

a first functional unit that has a first optical signal output unit capable of outputting an optical signal and outputs the optical signal according to a first function through the first optical signal output unit, the first functional unit and the first optical signal output unit being disposed within a second housing a second functional unit that has a second optical signal output unit capable of outputting an optical signal and an optical signal input unit capable of receiving an optical signal, and outputs an optical signal according to a second function through the second optical signal output unit, and receives an optical signal inputted through the optical signal input unit, the second functional unit, second optical signal output unit and the optical signal input unit all being disposed within a third housing; and a distribution-type optical signal transmission medium to which the image signal input unit, the first optical signal output unit, the second optical signal output unit, and the optical signal input unit are connected, and which distributes an optical signal outputted from at least the first optical signal output unit to the image signal input unit and the optical signal input unit, and transmits an optical signal outputted from the second optical signal output unit to the image signal input unit.

2. The multifunction system according to claim 1, wherein the first optical signal output unit and the second optical signal output unit include a unit that generates plural optical signals of different types, and the image signal input unit and the optical signal input unit include an extraction part that extracts an optical signal of a specific type from inputted optical signals.

3. The multifunction system according to claim 2, wherein the plural optical signals of different types are optical signals with different intensity levels.

4. The multifunction system according to claim 2, wherein the plural optical signals of different types are optical signals with different wavelengths.

5. The multifunction system according to claim 2, wherein the plural optical signals of different types are optical signals with different timings of output to the distribution-type optical signal transmission medium.

6. The multifunction system according to claim 2, further comprising:

an arbitrating part that arbitrates the respective communications of the image output unit, the first functional unit, and the second functional unit by specifying the types of optical signals to be outputted by the first optical signal output unit and the second optical signal output unit, and the types of optical signals to be extracted by the image signal input unit and the optical signal input unit.

7. The multifunction system according to claim 1, wherein the distribution-type optical transmission medium comprises a diffusion part that diffuses an inputted optical signal.

8. The multifunction system according to claim 1, wherein the image output unit is a printer, the first functional unit is an image reading system, and the second functional unit comprises at least a storage part that stores a signal inputted from the optical signal input unit, wherein the first functional unit outputs an optical signal in accordance with an image to be printed; the second functional unit stores in the storage part a signal according to the optical signal inputted through the optical signal input unit, and outputs the optical signal in accordance with the image through the second optical signal output unit; and the image output unit prints the image according to the optical signal inputted from the second functional unit through the image signal input unit.

9. The multifunction system according to claim 1, further comprising:

a third functional unit having a third optical signal output unit, the third optical signal output unit outputting an optical signal according to a third function to the distribution-type optical signal transmission medium, wherein the first functional unit outputs an optical signal to the image output unit through the first optical signal output unit, and the third functional unit transmits an optical signal to the second functional unit through the third optical signal output unit.

10. The multifunction system according to claim 1, wherein the distribution-type optical signal transmission medium has a plurality of input ports and a plurality of output ports, and an input from one of the plurality of the input ports is transmitted to the plurality of output ports.

11. A multifunction device according to claim 1, wherein the first, second, and third housings form a single, unified enclosure.

12. A multifunction system comprising:

an image output unit that has an image signal input unit capable of receiving an optical signal, and outputs an image according to an optical signal inputted from the image signal input unit, the image signal input unit being integral with, or directly fixed to, the image output unit;

a first functional unit that has a first optical signal output unit capable of outputting an optical signal and outputs the optical signal according to a first function through the first optical signal out unit, the first optical signal output unit being integral with, or directly fixed to the first functional unit;

a second functional unit that has a second optical signal output unit capable of outputting an optical signal and an optical signal input unit capable of receiving an optical signal, and outputs an optical signal according to a second function through the second optical signal output unit, and receives an optical signal inputted through the second optical signal input unit, the second optical signal output unit and the optical signal input unit both being integral with, or directly fixed to the second functional unit;

a distribution-type optical signal transmission medium to which the image signal input unit, the first optical signal output unit, the second optical signal output unit, and the optical signal input unit are connected, and which distributes an optical signal outputted from at least the first optical signal output unit to the image signal input unit and the optical signal input unit, and transmits an optical signal outputted from the second optical signal output unit to the image signal input unit; and an arbitrating part that arbitrates the respective communications of the image output unit, the first functional unit, and the second functional unit by specifying the types of optical signals to be outputted by the first optical signal output unit and the second optical signal output unit, and the types of optical signals to be extracted by the image signal input unit and the optical signal input unit, wherein each of the image signal input unit, the first optical signal output unit, and the second optical signal output unit together with the optical signal input unit comprises:
- a communication request circuit communicatively coupled to the arbitrating part, and
- the arbitrating part arbitrates, through the respective communication request circuit, the types of optical signals outputted or received by the image signal input unit, the first optical signal output unit, the second optical signal output unit, and the optical signal input unit.

13. The multifunction system according to claim 12, wherein the image signal input unit and the optical signal input unit each further comprise:
- a level selection circuit that indicates the intensity level of a signal to extract, the level selection circuit connected to the respective communication request circuit; and
- a separation and extraction circuit that extracts a signal having the intensity level indicated by the level selection circuit, and the first optical signal output unit and the second optical signal output unit each further comprises:
- a level selection circuit that indicates the intensity level of an optical signal to be output, the level selection circuit connected to the respective communication request circuit; and
- a level converting circuit that controls the intensity level of the optical signal to be output.

14. The multifunction system according to claim 12, wherein the image signal input unit and the optical signal input unit each further comprises:
- a wavelength selection circuit that indicates the wavelength of a signal to extract, the wavelength selection circuit connected to the respective communication request circuit; and
- a separation and extraction circuit that extracts a signal having the wavelength indicated by the level selection circuit, and the first optical signal output unit and the second optical signal output unit each further comprises:
- a wavelength selection circuit that indicates the wavelength of an optical signal to output, the wavelength selection circuit connected to the respective communication request circuit; and
- a wavelength converting circuit that controls the wavelength of the optical signal to be output.

15. The multifunction system according to claim 12, wherein the image signal input unit and the optical signal input unit each further comprises:
- a timing selection circuit that indicates the intensity level of a signal to extract, the timing selection circuit connected to the respective communication request circuit; and
- a sampling circuit that extracts a signal having the timing indicated by the level selection circuit, and the first optical signal output unit and the second optical signal output unit each further comprises:
- a timing selection circuit that indicates the timing of optical signal to output, the timing selection circuit connected to the respective communication request circuit; and
- a buffer circuit that controls the timing of the optical signal to be output.

16. A multifunction system comprising:
- an image input unit that is an image reading device, the image input unit having a first optical signal output device capable of outputting an optical signal, the first optical signal output device being integral with, or directly fixed to, the image input unit, the image input unit generating first image data according to a first function and outputting a first optical signal comprising the first image data through the first optical signal output device;
- an image processing unit that processes images, the image processing unit having an optical signal input device capable of receiving an optical signal and a second optical signal output device capable of outputting an optical signal, the optical signal input device and the second optical signal output device both being integral with, or directly fixed to the image processing unit, the image processing unit receiving the first optical image signal, processing the first image by a second function to produce a second image, and outputting a second optical signal comprising the second image through the second optical signal output device;
- an image output unit that is a printer, the image output unit having an image signal input device capable of receiving an optical signal, the image signal input device being integral with, or directly fixed to, the image output unit, the image output unit receiving the second optical signal and outputting the second image; and
- a distribution-type optical signal transmission medium to which the first optical signal output device, the optical signal input device, the second optical signal output device, and the image signal input device are connected, and which distributes an optical signal outputted from at least the first optical signal output device to the image signal input device, and transmits an optical signal outputted from the second optical signal output device to the image signal input device.

17. The multifunction system according to claim 16, further comprising:
- a housing, wherein
- the image input unit, the image processing unit, and the image output unit are all within, integral with, or fixedly attached to, the housing.

* * * * *